(12) United States Patent
Relyea

(10) Patent No.: US 8,422,673 B2
(45) Date of Patent: Apr. 16, 2013

(54) METHOD AND SYSTEM FOR PROTECTING AGAINST UNITY KEYS

(75) Inventor: Robert Relyea, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 842 days.

(21) Appl. No.: 11/469,438

(22) Filed: Aug. 31, 2006

(65) Prior Publication Data

US 2008/0069342 A1    Mar. 20, 2008

(51) Int. Cl.
*H04L 29/06* (2006.01)

(52) U.S. Cl.
USPC ............................................................ 380/30

(58) Field of Classification Search ...................... 380/30
See application file for complete search history.

(56) References Cited

U.S. PATENT DOCUMENTS 5,907,704 A * 5/1999 Gudmundson et al. ....... 717/100
2005/0065756 A1 * 3/2005 Hanaman et al. .................. 703/2
2005/0182985 A1 * 8/2005 Shipton et al. ................ 713/340
2007/0100825 A1 * 5/2007 Guenthner et al. ............... 707/7

OTHER PUBLICATIONS

Hopkins, "A New View of Statistics: Sample Size on the Fly", Dec. 8, 1997. www.sportsci.org/resources/stats/ssonthefly.html pp. 1-3.*
Menezes et al., Handbook of Applied Cryptography, Oct. 1996, CRC Press, 1 page.*

* cited by examiner

*Primary Examiner* — Hadi Armouche
*Assistant Examiner* — Lisa Lewis
(74) *Attorney, Agent, or Firm* — Lowenstein Sandler LLP

(57) ABSTRACT

An apparatus, method and/or computer-readable medium protects against use of a unity key in a public key infrastructure (PKI). A public key and a private key are acquired according to the PKI. A message is encrypted by the public key to obtain ciphertext. A portion of the ciphertext is compared with a portion of the message. If the portion of the ciphertext is substantially equal to the portion of the message, a larger portion of the ciphertext is compared with a larger portion of the message to determine if the ciphertext is substantially equal to the message. If the ciphertext is substantially equal to the message, the ciphertext is rejected.

16 Claims, 10 Drawing Sheets

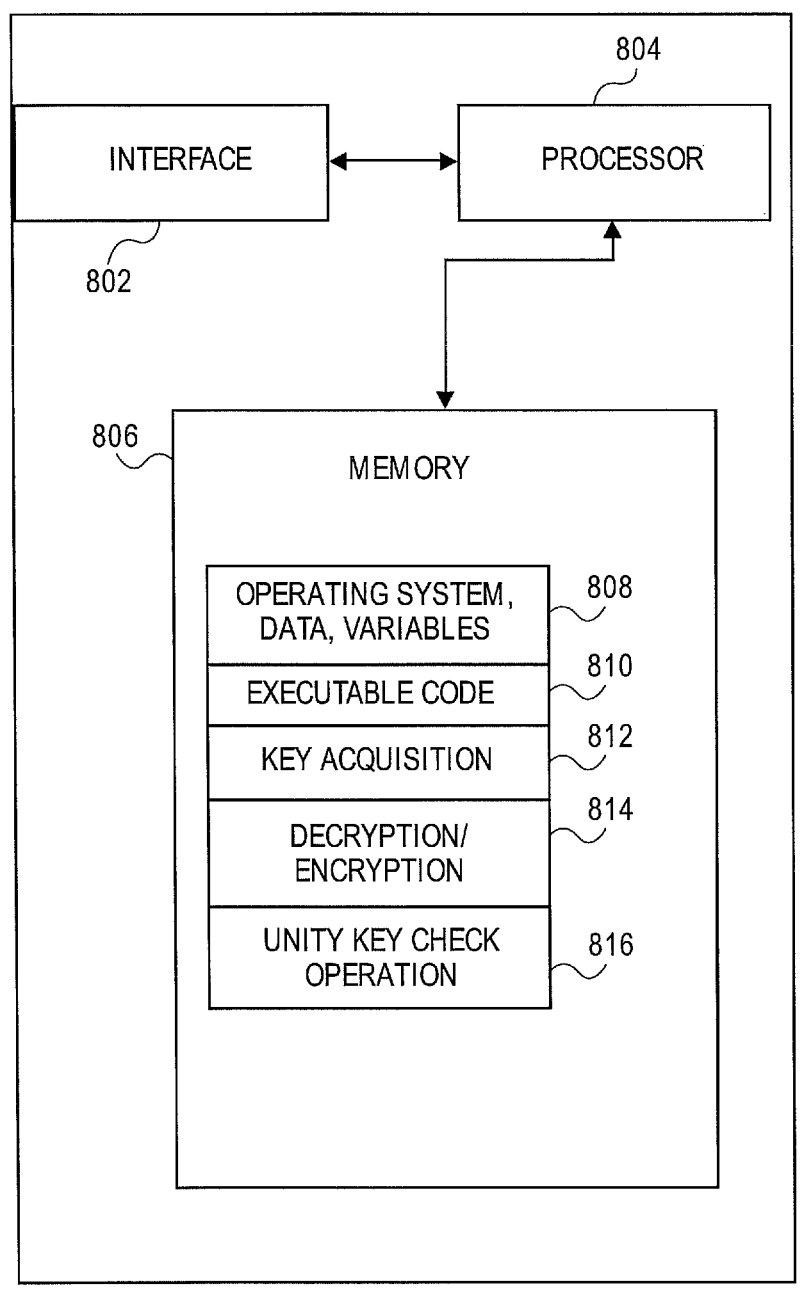

METHOD AND SYSTEM FOR PROTECTING AGAINST UNITY KEYS

FIELD OF THE INVENTION

The present invention relates generally to key based infrastructures and, more particularly, to a method and apparatus for protecting against use of unity keys in a key based infrastructure.

BACKGROUND OF THE INVENTION

Key based authentication and encryption methodologies are conventionally used as a secure manner of authentication and encryption, and can exist in many forms. For example, in a (Rivest Shamir Adleman) RSA based public key infrastructure (PKI), a sender encrypts a message to be sent to a recipient into ciphertext by a public key of the recipient. The recipient has previously made the public key freely available. The recipient can decrypt the ciphertext by using a private key known only by the intended recipient to obtain the message. Thereby, the sender can know with certainty that the message was only read by the intended recipient.

In detail, the public key includes a first integer n (the modulus) that is obtained by multiplying two large prime numbers p and q as shown in Equation (1):

$$n = p*q \quad (1)$$

The public key also includes a second integer that is obtained by first calculating an integer z according to Equation (2):

$$z = (p-1)(q-1) \quad (2)$$

The second integer e of the public key is obtained by choosing an integer that is prime relative to z. The public key includes both of these integers (n, e).

The private key also includes the modulus n and an integer d that is obtained by satisfying Equation (3):

$$d*e \bmod z = 1 \quad (3)$$

When choosing e, d and z should have no common divisor other than 1. That is, d is the multiplicative inverse of e. The private key is then (n, d). In principle, the integer e of the private key can be obtained from the public key. However, this requires knowledge of z, which in turn requires knowledge of the prime factors of the modulus n. By assumption, determining the factors of the modulus n is computationally infeasible as long as n is sufficiently large.

The message M can then be encrypted into data, referred to as ciphertext C, according to Equation (4) for encryption:

$$C = M^e \bmod n \quad (4)$$

The cyphertext is transmitted over a communication medium to the recipient. The recipient can then recover the original message M by Equation (5) for decryption:

$$M = C^d \bmod n \quad (5)$$

In practice, a user will be assigned the modulus n and integer e of the public key by a key generation program that may generate the integers randomly. However, a problem may occur when the generated public key is a unity key. By definition, a resultant output of an operation on a unity key will be the same as an input. Therefore, if a message is encrypted by a unity key, the ciphertext will be similar to the message itself, thereby defeating the purpose of encryption. Further, the difficulty an obtaining the prime factors of the modulus n may be reduced significantly once an individual discovers that the public key is a unity key, thereby compromising the private key of the PKI.

For example, suppose in an exemplary encryption operation a message M=2 is encrypted by a public key that includes modulus n=15 and e=5. The encryption operation will be performed according to Equation 4 in which $C = 2^5 \bmod 15 = 2$. That is, because the public key (2, 5) is a unity key, the resultant ciphertext (C=2) is equal to the message (M=2).

The above problem regarding a unity key can also occur during a digital signature generation and a digital signature verification process. For example, a party may desire to verify that a particular entity from which a message is received is actually that particular entity. Therefore, before sending the message, the particular entity can sign the message with a digital signature based upon the particular entity's private key by, for example, encrypting a portion of the message with the private key. The party can then verify that the digital signature is valid by decrypting the digital signature with the public key for the particular entity. The party can then have a certain degree of confidence that the particular entity is the entity it claims to be if the message is successfully decrypted because only that particular entity will have the private key. However, if the private key is a unity key, the digital signature will be equal to the portion of the message. Further, if the public key is a unity key, the decrypted message will be equal to the ciphertext. Thus, the desired level of confidence cannot be achieved.

Therefore it would be desirable for a solution to enable rejection of encryption, decryption, digital signatures, verification, or generally any operation based upon a unity key. In addition, factors such as scalability, standards compliance, regulatory compliance, security administration and the like must also be taken into consideration.

While a general background including problems in the art are described hereinabove, with occasional reference to related art or general concepts associated with the present invention, the above description is not intended to be limiting since the primary features of the present invention will be set forth in the description which follows. Some aspects of the present invention not specifically described herein may become obvious after a review of the attendant description, or may be learned by practice of the invention. Accordingly, it is to be understood that both the foregoing general description and the following detailed description are exemplary and explanatory only in nature and are not restrictive of the scope or applicability of the present invention.

BRIEF DESCRIPTION OF THE DRAWINGS

The accompanying drawings, which are incorporated in and constitute a part of this specification, illustrate various exemplary embodiments of the invention and together with the description, serve to explain the principles of the invention. In the figures:

FIG. 8 is a block diagram illustrating portions of an exemplary apparatus.

DETAILED DESCRIPTION

In overview, the present disclosure concerns an apparatus for performing secure communication via a key based infrastructure. Such an apparatus can be implemented in user entities of computer systems which support access of independent data objects representing certificates, keys, identifiers, and related data, for example by providing end-user interfaces, managing keys, and providing authentication. More particularly, various inventive concepts and principles are embodied in apparatus and methods therein for preventing usage of a unity key in the key based infrastructure.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

As further discussed herein below, various inventive principles and combinations thereof are advantageously employed to protect against use of a unity key in a key based infrastructure. The phrase "data objects" as used herein refers to information representing private and public keys, messages, ciphertext and related data. This information is conventionally stored somewhere on an apparatus or in a memory accessible by the apparatus.

Reference will now be made in detail to the accompanying drawings. Wherever possible, the same reference numbers will be used throughout the drawings to refer to the same or like parts.

Accordingly, one or more embodiments relate generally to an apparatus, method and/or computer-readable medium for protecting against use of a unity key in a key based infrastructure. Generally, resultant ciphertext from encrypting data based upon a public or private key is compared with the data and the encryption is rejected if the comparison shows that both the ciphertext and the data are equal.

Figure 1:
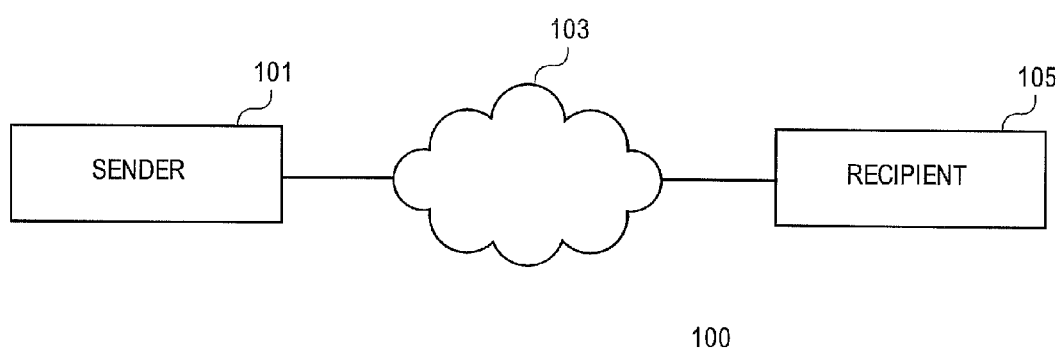
FIG. 1 is a diagram illustrating an exemplary computer system configured in accordance with a key based infrastructure in which user entities perform secure communication.

Referring now to FIG. 1, a simplified and representative environment in which the apparatus and methodologies can be implemented will be discussed and described. The environment includes a computer system 100 and user entities of the computer system 100 such as a sender 101 and a recipient 105. The sender 101 and the recipient 105 are connected via a connection 103 which can be a direct connection such as a wired or wireless connection or can be an indirect connection such as a connection through the Internet, local area network, wide area network, communication network, etc. Generally, the connection 103 provides a communication channel for the sender 101 and the recipient 105.

The computer system 100 is configured according to a key based infrastructure such as, for example, a public key infrastructure (PKI) in which the sender 101 encrypts data into ciphertext based upon a public key associated with the recipient 105 and sends the ciphertext to the recipient 105 over the connection 103. The recipient 105 decrypts the ciphertext based upon a private key to obtain the data. The public key and the private key can be acquired according to, for example, the Rivest Shamir Adleman (RSA) based PKI in which the public and private keys are acquired according to Equations (1)-(3).

Referring to FIGS. 2A-2D, a user entity of the computer system 100 such as the sender 101 and a recipient 105 will be discussed in detail. The sender 101 and the recipient 105 may both be a general purpose computer or dedicated computing platform configured to execute secure and/or unsecure, or open applications through a multiple user operating system. The recipient 105 or the sender 101 may also be a server and a client device in communication via a secure sockets layer (SSL) encryption scheme. A server can be implemented with general purpose server platforms as known to those skilled in the art from Intel, Advanced Micro Devices, Hewlett-Packard, and/or others or can be implemented with other custom configured server architectures. As will be discussed in more detail below, the user entity includes an apparatus composed of modules that will be referred to as blocks for protecting against use of a unity key in the PKI. The blocks can be implemented by software code or hardware installed at the user entity.

Figure 2A:
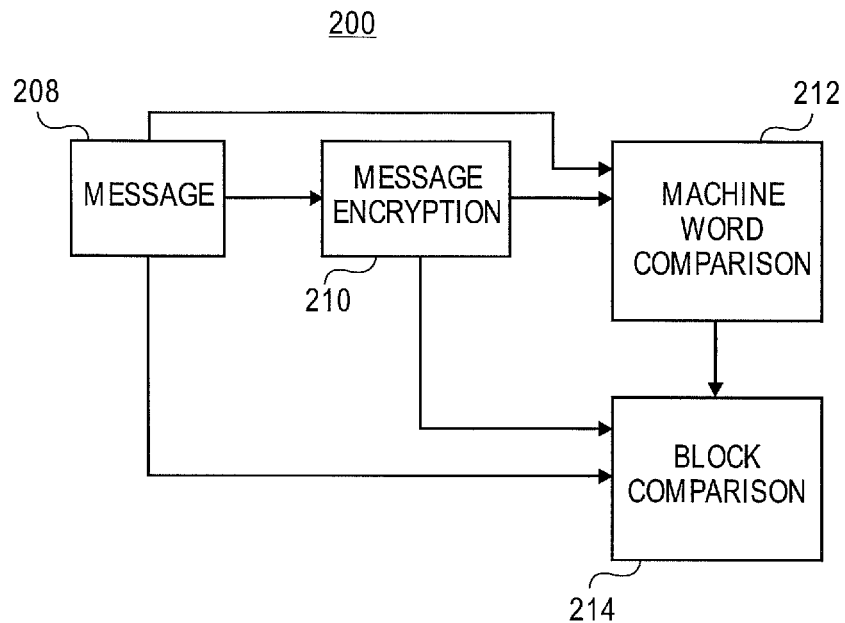
FIG. 2A is a block diagram illustrating exemplary portions of an apparatus for protecting against use of a unity key during message encryption in a key based infrastructure.

Referring to FIG. 2A, exemplary portions of an apparatus 200 for protecting against use of a unity key during message encryption in a key based infrastructure will be discussed. The apparatus 200 can be implemented in or by the user entity of the computer system 100 such as the sender 101 and the recipient 105. A message block 208 generates or obtains data such as a message to be sent to another user entity such as the recipient 105. A message encryption block 210 acquires a key and uses the key to encrypt the message into ciphertext in accordance with the key based infrastructure. If the key based infrastructure is an RSA PKI, then the encryption and acquisition of the keys can be performed according to Equations (1)-(4). A machine word comparison block 212 and block comparison block 214 are for determining if the ciphertext is substantially equal to the message. The machine word comparison block 212 can compare a portion of the ciphertext such as a machine word with a portion of the message such as a machine word. If the machine word comparison block 212 determines that the portion of the ciphertext is substantially equal to the portion of the message, then the block comparison block 214 can compare a larger portion of the ciphertext such as an entire or full block with a larger portion of the message such as an entire or full block. The ciphertext can be rejected if the block comparison block 214 determines that the larger portion of the ciphertext is substantially equal to the larger portion of the message. That is, the key that was used to generate the ciphertext can be rejected.

Figure 2B:
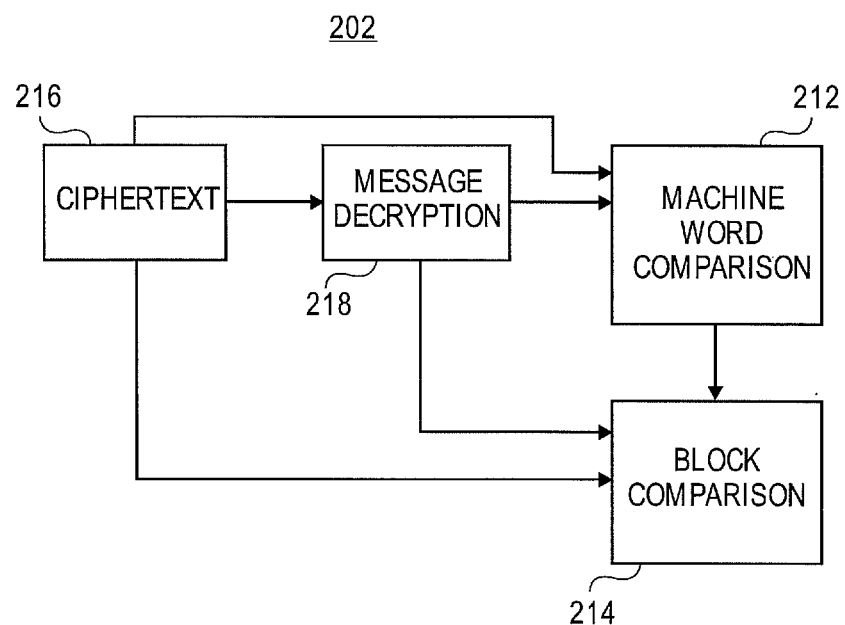
FIG. 2B is a block diagram illustrating exemplary portions of an apparatus for protecting against use of a unity key during message decryption in a key based infrastructure.

Referring to FIG. 2B, exemplary portions of an apparatus 202 for protecting against use of a unity key during message decryption in a key based infrastructure will be discussed. The apparatus can be implemented in or by the user entity of the computer system 100 such as the recipient 105 and the sender 101. A ciphertext block 216 generates or obtains ciphertext. The ciphertext can be, for example, an encrypted message received from the sender 101. The message may have been encrypted by using a private key. A message decryption block 218 acquires a key and uses the key to decrypt the ciphertext into the message in accordance with the key based infrastructure. The key may be, for example, a public key associated with the sender 101. A machine word comparison block 212 and block comparison block 214 are for determining if the ciphertext is substantially equal to the message. The machine word comparison block 212 can compare a portion of the ciphertext such as a machine word with a portion of the message such as a machine word. If the machine word comparison block 212 determines that the portion of the ciphertext is substantially equal to the portion of the message, then the block comparison block 214 can compare a larger portion of the ciphertext such as an entire or full block with a larger portion of the message such as an entire or full block. The message can be rejected if the block comparison block 214 determines that the larger portion of the ciphertext is substantially equal to the larger portion of the message. That is, the public key that was used to decrypt the ciphertext can be rejected.

Figure 2C:
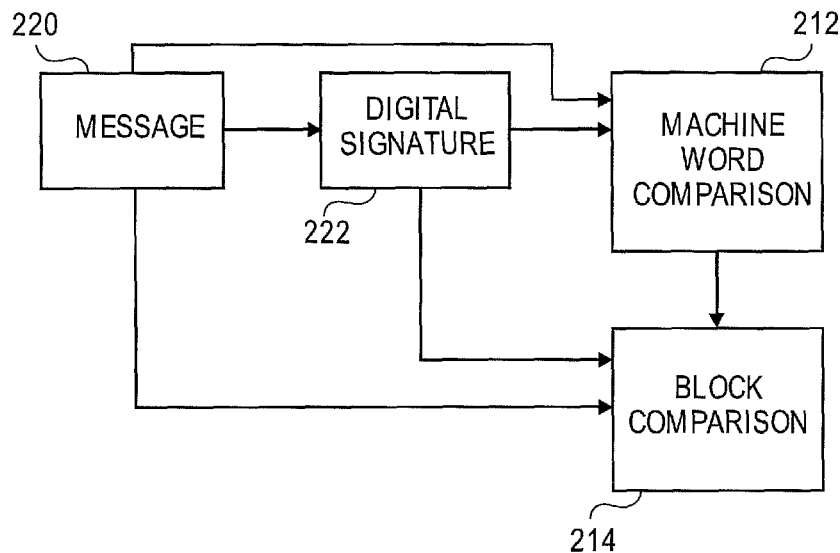
FIG. 2C is a block diagram illustrating exemplary portions of an apparatus for protecting against use of a unity key during digital signature generation in a key based infrastructure.

Referring to FIG. 2C, exemplary portions of an apparatus 204 for protecting against use of a unity key during digital signature generation in a key based infrastructure will be discussed. The apparatus can be implemented in or by the user entity of the computer system 100 such as the sender 101 and the recipient 105. A message block 220 generates or obtains data such as a message to be sent to another user entity such as the recipient 105. A digital signature block 222 acquires a key and uses the key to encrypt the message into ciphertext as a digital signature. The key may be, for example, a private key acquired according to the RSA PKI. A machine word comparison block 212 and block comparison block 214 are for determining if the ciphertext of the digital signature is substantially equal to the message. The machine word comparison block 212 can compare a portion of the ciphertext such as a machine word with a portion of the message such as a machine word. If the machine word comparison block 212 determines that the portion of the ciphertext is substantially equal to the portion of the message, then the block comparison block 214 can compare a larger portion of the ciphertext such as an entire or full block with a larger portion of the message such as an entire or full block. The ciphertext can be rejected if the block comparison block 214 determines that the larger portion of the ciphertext is substantially equal to the larger portion of the message. That is, the key that was used to generate the digital signature can be rejected.

Figure 2D:
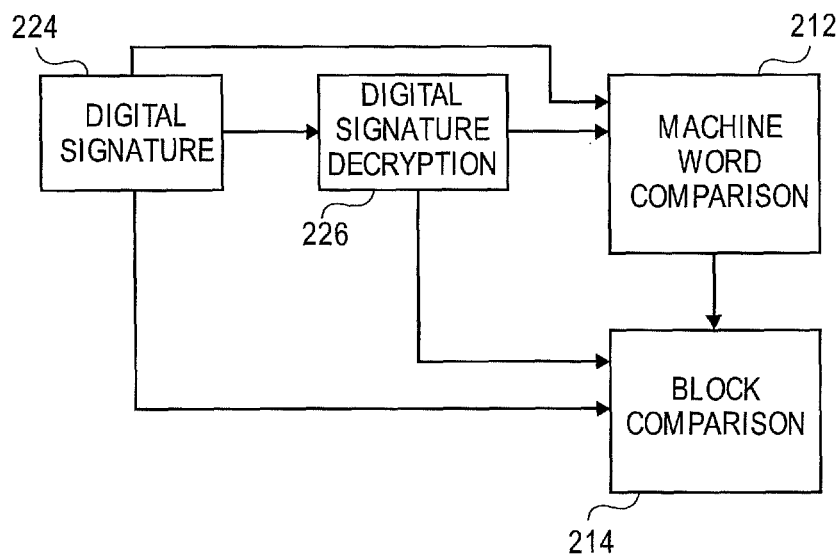
FIG. 2D is a block diagram illustrating exemplary portions of an apparatus for protecting against use of a unity key during digital signature verification in a key based infrastructure.

Referring to FIG. 2D, exemplary portions of an apparatus 206 for protecting against use of a unity key during digital signature verification in a key based infrastructure will be discussed. The apparatus can be implemented in or by a first user entity of the computer system 100 such as the recipient 105 and the sender 101. A digital signature block 224 obtains a digital signature received from, for example, a second user entity. The digital signature may have been generated by the second user entity by using a private key to encrypt a message. The second user entity can acquire the private key and a public key according to the RSA PKI. A digital signature decryption block 226 acquires the public key and uses the public key to decrypt the digital signature into a decrypted digital signature. A machine word comparison block 212 and block comparison block 214 are for determining if the ciphertext of the digital signature is substantially equal to the decrypted digital signature. The machine word comparison block 212 can compare a portion of the digital signature such as a machine word with a portion of the decrypted digital signature such as a machine word. If the machine word comparison block 212 determines that the portion of the digital signature is substantially equal to the portion of the decrypted digital signature, then the block comparison block 214 can compare a larger portion of the digital signature such as an entire or full block with a larger portion of the decrypted digital signature such as an entire or full block. The digital signature can be rejected if the block comparison block 214 determines that the larger portion of the digital signature is substantially equal to the larger portion of the decrypted digital signature.

It should be noted that although the apparatus 200, 202, 204, 206 are shown separately, all of the blocks or modules can be implemented in one user entity such as the sender 101 or the recipient 105.

Figure 3A:
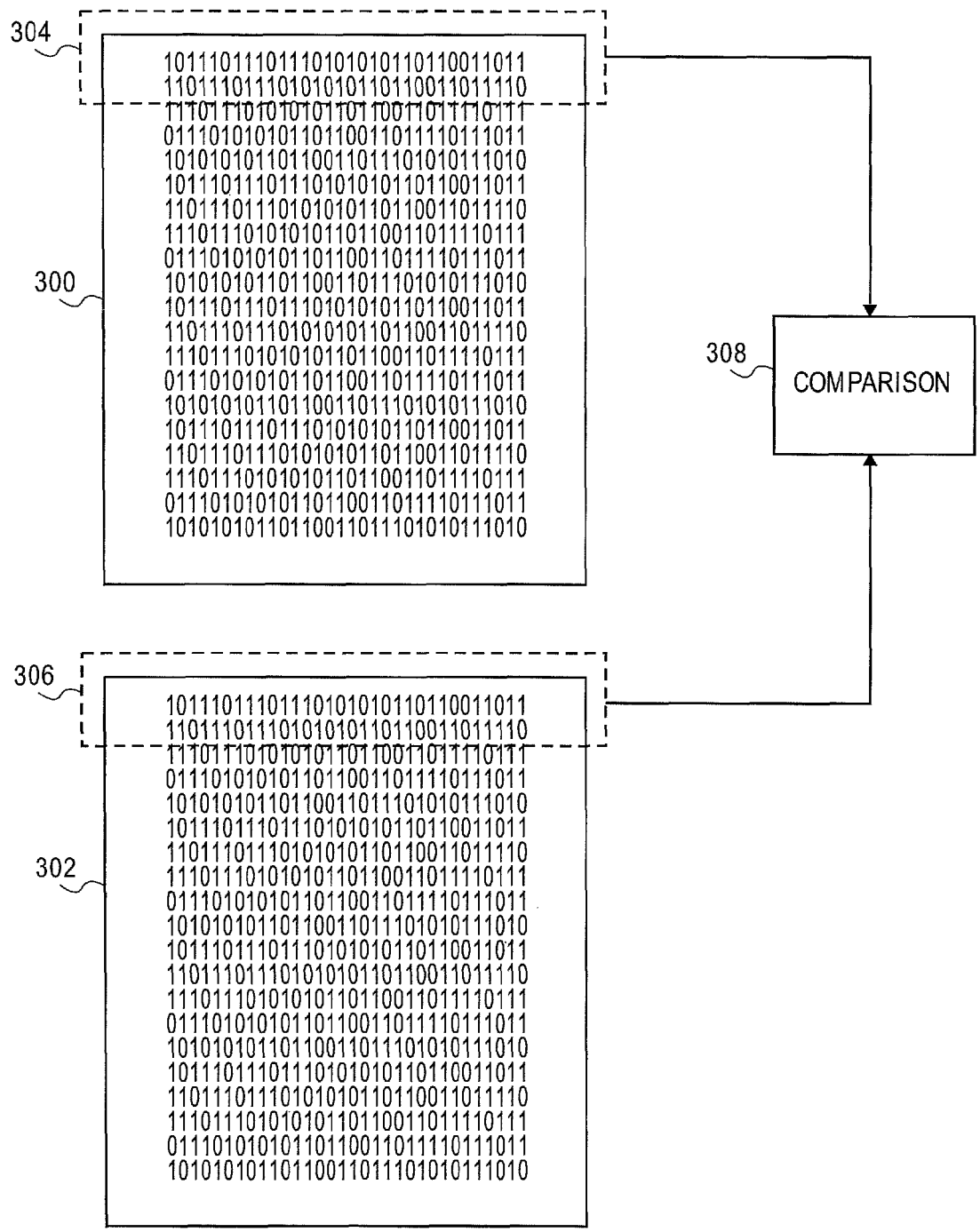
FIG. 3A is a diagram illustrating one exemplary operation of an apparatus according to one embodiment.
Figure 3B:
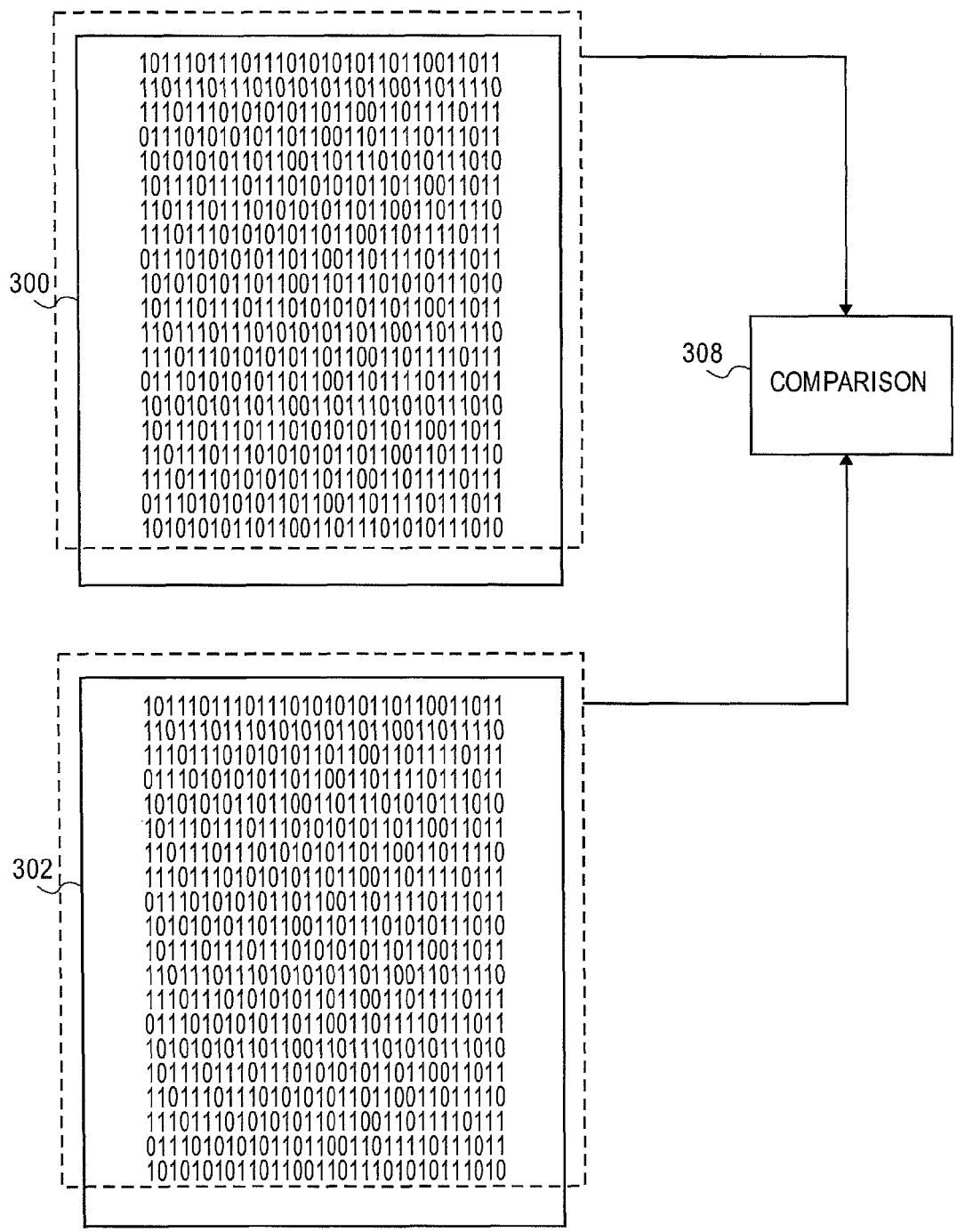
FIG. 3B is a diagram illustrating another exemplary operation of the apparatus according to the embodiment.

Referring to FIGS. 3A-3B, an exemplary comparison operation will be discussed. As shown in FIG. 3A, a ciphertext 300 is compared to a message 302 by first inputting a machine word 304 of the ciphertext 300 with a machine word 306 of the message 302 into a comparator 308. The comparator 308 may be implemented by a logic gate, an input to an arithmetic logic unit or a procedure implemented in a high level or low level programming language. As shown in FIG. 3B, because the machine words of the ciphertext 300 and the message 302 are equal, an entire block of the ciphertext 300 is compared to an entire block of the message 302 by the comparator 308.

Figure 4:
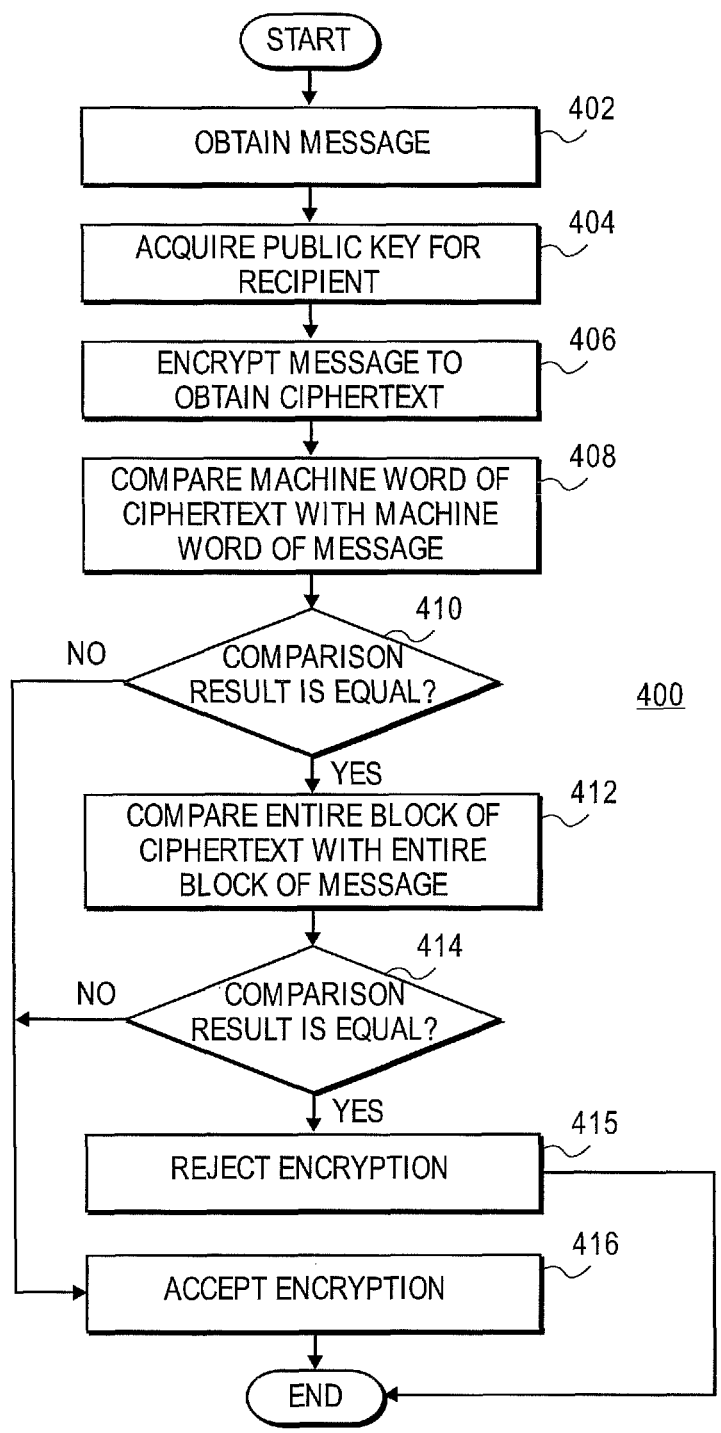
FIG. 4 is a flow chart illustrating a methodology for protecting against use of a unity key during message encryption in a key based infrastructure.

Referring now to FIG. 4, a methodology 400 for protecting against use of a unity key during message encryption in the PKI will be discussed with reference to the environment of FIG. 1. At 402, the sender 101 obtains a message to be sent to the recipient 105. At 404, the sender 101 acquires the public key for the recipient 105. The public key may be acquired by, for example, prior communication with the recipient 105 or accessing a directory of public keys for recipients stored locally or in a remote directory. At 406, the sender 101 encrypts the message by the public key to obtain ciphertext. If the PKI is an RSA based PKI, the encryption can be performed according to Equation (4).

At 408-414, the sender 101 determines if the ciphertext is substantially equal to the message. The public key acquired at 404 may be as long as 1024-2048 bits or more. Therefore, the resultant ciphertext can consume many machine bit words of an output stream. However, an operation to compare every output stream of ciphertext will be time consuming. Therefore, a sender 101 determines if the ciphertext is substantially equal to the message by first comparing a first portion of the ciphertext with a first portion of the message and then comparing a larger portion of the ciphertext with a larger portion of the message only if the first portion of the ciphertext is substantially equal to the first portion of the message.

That is, at 408, the sender 101 compares a machine word of the ciphertext with a machine word of the message. If, at 410, the sender 101 determines that the machine word of the ciphertext is substantially equal to the machine word of the message, that is YES at 410, then at 412 the sender 101 compares an entire block of the ciphertext with an entire block of the message. At 414, the sender 101 determines if the entire block of the ciphertext is substantially equal to the entire block of the message. If the sender 101 determines that the entire block of the ciphertext is substantially equal to the entire block of the message, that is, YES at 414, then at 415 the sender 101 rejects the encryption. That is, the sender 101 rejects the ciphertext. Here, a request could be sent to the recipient 105 to generate a new public and private key.É

If, at 410, the sender 101 determines based upon the comparison that the machine word of the ciphertext is not substantially equal to the machine word of the message, that is NO at 410, or, if, at 414, the sender 101 determines that the entire block of the ciphertext is not substantially equal to the entire block of the message, that is NO at 414, then at 416 the sender 101 accepts the encryption. That is, the sender 101 sends the ciphertext to the recipient 105 over the connection 103.

Figure 5:
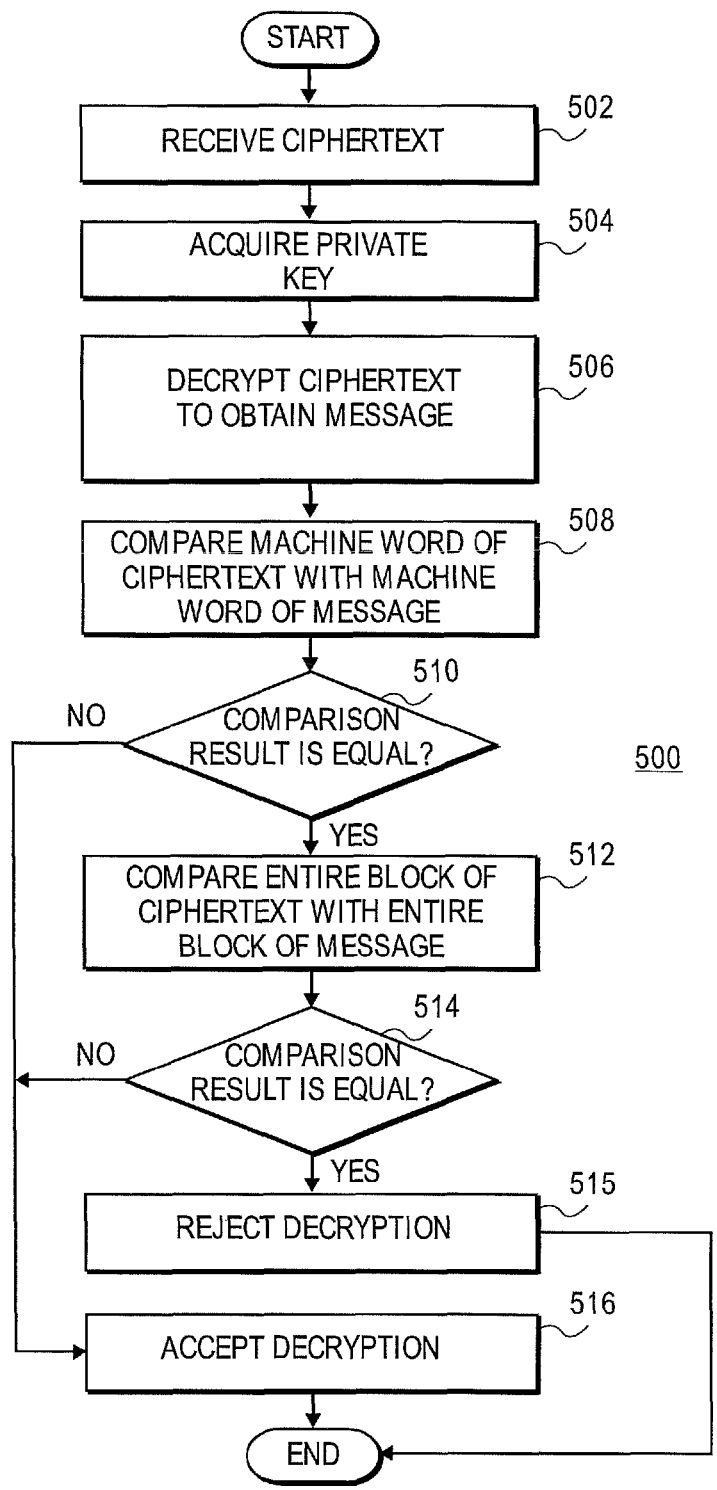
FIG. 5 is a flow chart illustrating a methodology for protecting against use of a unity key during message decryption in a key based infrastructure.

Referring now to FIG. 5, a methodology 500 for protecting against use of a unity key during decryption in the PKI will be discussed with reference to the environment of FIG. 1. At 502, the recipient 105 receives ciphertext from the sender 101. The ciphertext will include a message encrypted by the sender 101 based upon a public key. At 504, the recipient 105 acquires the private key for decrypting the ciphertext. At 506, the recipient 105 decrypts the ciphertext by the private key to obtain the message. If the PKI is an RSA based PKI, the decryption can be performed according to Equation (5).

At 508-514, the recipient 105 determines if the ciphertext is substantially equal to the message. As discussed above, comparing the ciphertext and the message can consume many machine bit words of an output stream. Therefore, the recipient 105 determines if the ciphertext is substantially equal to the message by first comparing a first portion of the ciphertext with a first portion of the message and then comparing a larger portion of the ciphertext with a larger portion of the message only if the first portion of the ciphertext is substantially equal to the first portion of the message.

That is, at 508, the recipient 105 compares a machine word of the ciphertext with a machine word of the message. If, at 510, the recipient 105 determines that the machine word of the ciphertext is substantially equal to the machine word of the message, that is, YES at 510, then at 512 the recipient 105 compares an entire block of the ciphertext with an entire block of the message. At 514, the recipient 105 determines if the entire block of the ciphertext is substantially equal to the entire block of the message. If the recipient 105 determines that the entire block of the ciphertext is substantially equal to the entire block of the message, that is, YES at 514, then at 515 the recipient 105 rejects the decryption. That is, the recipient 105 rejects the private and public keys.

If, at 510, the recipient 105 determines based upon the comparison that the machine word of the ciphertext is not substantially equal to the machine word of the message, that is, NO at 510, or, if, at 514, the recipient 105 determines that the entire block of the ciphertext is not substantially equal to the entire block of the message, that is, NO at 514, then at 516 the recipient 105 accepts the decryption.

Figure 6:
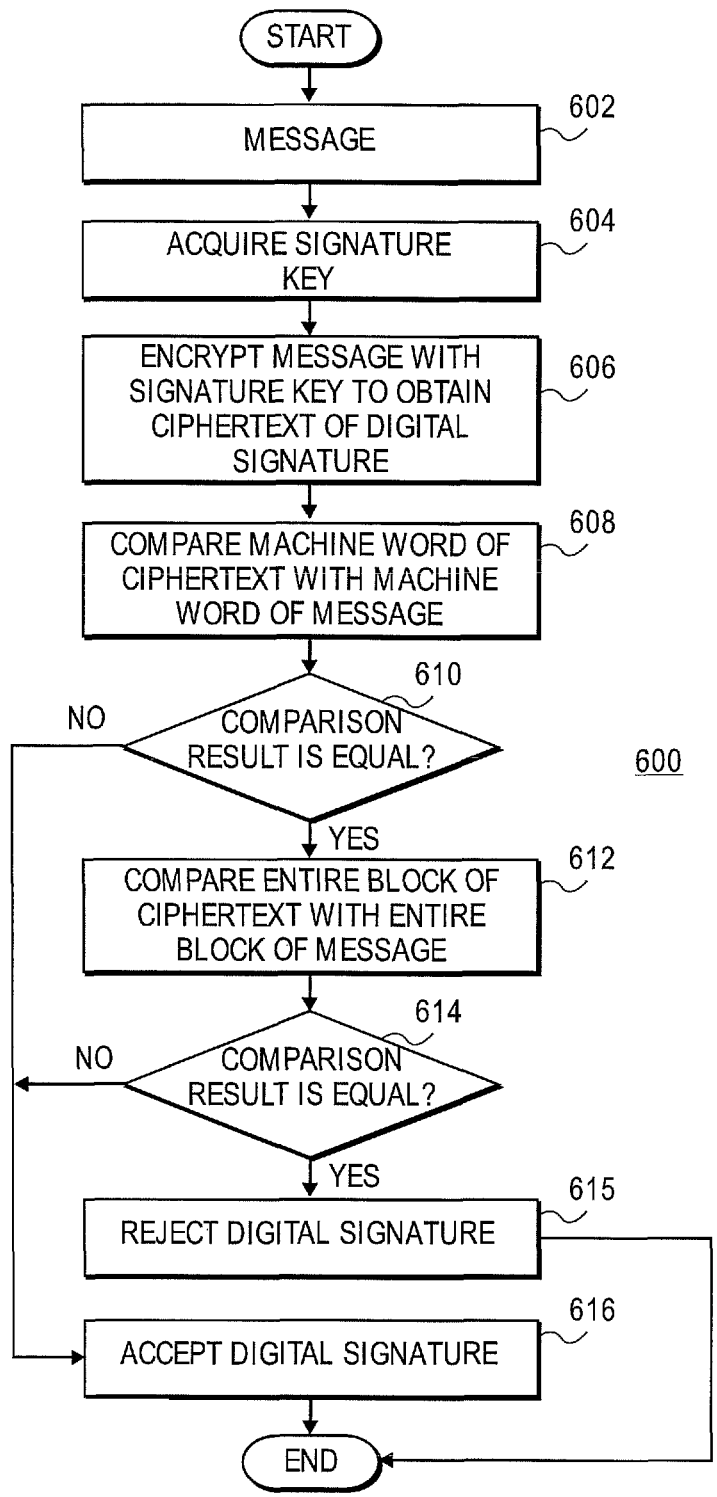
FIG. 6 is a flow chart illustrating a methodology for protecting against use of a unity key during digital signature generation in a key based infrastructure.

Referring now to FIG. 6, a methodology 600 for protecting against use of a unity key during digital signature generation in the PKI will be discussed with reference to the environment of FIG. 1. At 602, the sender 101 obtains a message to be sent to the recipient 105. At 604, the sender 101 acquires the digital signature key. The digital signature key may be the private key of the sender 101 and may be acquired by, for example, accessing a local or remote secure memory source. At 606, the sender 101 encrypts a portion of the message by the digital signature key to obtain ciphertext as the digital signature. If the PKI is an RSA based PKI, the encryption can be performed according to Equation (4).

At 608-614, the sender 101 determines if the ciphertext is substantially equal to the message. The digital signature key acquired at 604 may be as long as 1024-2048 bits or more. Therefore, the resultant ciphertext can consume many machine bit words of an output stream. However, an operation to compare every output stream of ciphertext will be time consuming. Therefore, the sender 101 determines if the ciphertext is substantially equal to the message by first comparing a first portion of the ciphertext with a first portion of the message and then comparing a larger portion of the ciphertext with a larger portion of the message only if the first portion of the ciphertext is substantially equal to the first portion of the message.

That is, at 608, the sender 101 compares a machine word of the ciphertext with a machine word of the message. If, at 610, the sender 101 determines that the machine word of the ciphertext is substantially equal to the machine word of the message, that is, YES at 610, then at 612 the sender 101 compares an entire block of the ciphertext with an entire block of the message. At 614, the sender 101 determines if the entire block of the ciphertext is substantially equal to the entire block of the message. If the sender 101 determines that the entire block of the ciphertext is substantially equal to the entire block of the message, that is, YES at 614, then at 615 the sender 101 rejects the ciphertext as the digital signature. Here, the sender 101 could generate new public and private keys.

If, at 610, the sender 101 determines based upon the comparison that the machine word of the ciphertext is not substantially equal to the machine word of the message, that is, NO at 610, or, if, at 614, the sender 101 determines that the entire block of the ciphertext is not substantially equal to the entire block of the message, that is, NO at 614, then at 616 the sender 101 accepts the ciphertext as the digital signature. That is, the sender 101 sends the ciphertext to the recipient 105 over the connection 103.

Figure 7:
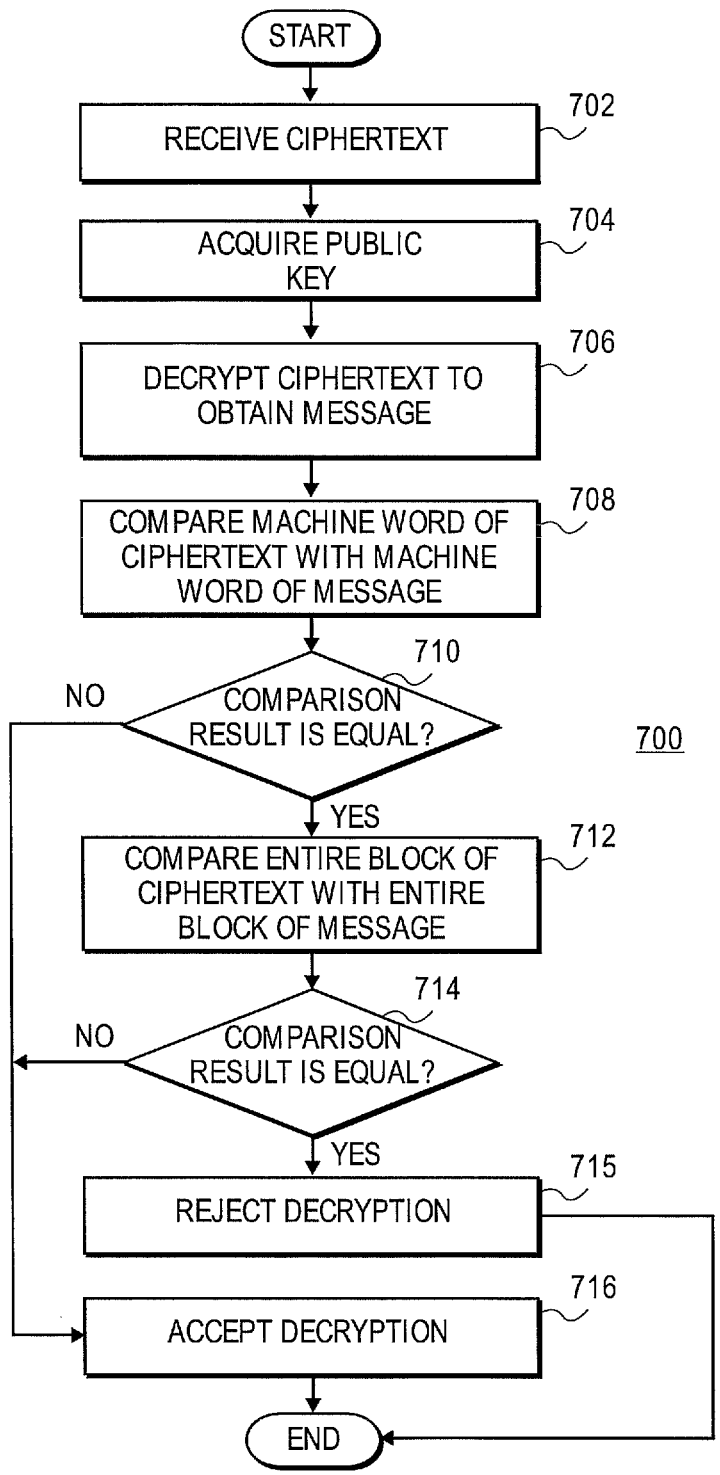
FIG. 7 is a flow chart illustrating a methodology for protecting against use of a unity key during digital signature verification in a key based infrastructure.

Referring now to FIG. 7, a methodology 700 for protecting against use of a unity key during sender verification in the PKI will be discussed with reference to the environment of FIG. 1. At 702, the recipient 105 receives ciphertext from the sender 101. The ciphertext will include a digital signature generated by the sender 101 based upon a digital signature key private to the sender 101. At 704, the recipient 105 acquires the public key for decrypting the ciphertext. At 706, the recipient 105 decrypts the message by the public key to obtain the message. If the PKI is an RSA based PKI, the decryption can be performed according to Equation (5). If the ciphertext is not decrypted, then the digital signature is not valid.

At 708-714, the recipient 105 determines if the ciphertext is substantially equal to the message. Similarly to the public key as discussed above, the private key used by the sender 101 to generate the ciphertext may be as long as 1024-2048 bits or more. Therefore, the ciphertext of the digital signature can also consume many machine bit words of an output stream. Therefore, the recipient 105 determines if the ciphertext is substantially equal to the message by first comparing a first portion of the ciphertext with a first portion of the message and then comparing a larger portion of the ciphertext with a larger portion of the message only if the first portion of the ciphertext is substantially equal to the first portion of the message.

That is, at 708, the recipient 105 compares a machine word of the ciphertext with a machine word of the message. If, at 710, the recipient 105 determines that the machine word of the ciphertext is substantially equal to the machine word of the message, that is, YES at 710, then at 712 the recipient 105 compares an entire block of the ciphertext with an entire block of the message. At 714, the recipient 105 determines if the entire block of the ciphertext is substantially equal to the entire block of the message. If the recipient 105 determines that the entire block of the ciphertext is substantially equal to the entire block of the message, that is, YES at 714, then at 715 the recipient 105 rejects the decryption. That is, the recipient 105 rejects the digital signature.

If, at 710, the recipient 105 determines based upon the comparison that the machine word of the ciphertext is not substantially equal to the machine word of the message, that is, NO at 710, or, if, at 714, the recipient 105 determines that the entire block of the ciphertext is not substantially equal to the entire block of the message, that is, NO at 714, then at 716 the recipient 105 accepts the digital signature.

Therefore, in methods 400, 500, 600 and 700, because the comparison is performed first on a single machine word of the output stream, the most common case in which the ciphertext is not equal to the message is eliminated before comparing the entire output stream, thereby preventing consumption of many machine bit words of the output stream.

Referring to FIG. 8, an apparatus 800 that can implement the methodologies shown in FIGS. 4-7 as well as the apparatus shown in FIGS. 2A-2D will be discussed. The apparatus 800 can be the sender 101 and the recipient 105 or be implemented within the sender 101 and the recipient 105. The apparatus 800 includes a network interface 802, a processor 804 and a memory 806. The network interface 802 is generally for providing connection with the connection 103. The network interface 802 may be a universal serial bus cable, a transceiver, etc. depending on the type of connection 103. The processor 804 can be one of a variety of different processors including general purpose processors, custom processors, controllers, compact eight-bit processors or the like. The memory 806 can be one or a combination of a variety of types of memory such as random access memory (RAM), read only memory (ROM), flash memory, dynamic RAM (DRAM) or the like. The memory 806 can include a basic operating system, data, and variables 808, and executable code 810. Further, the memory 806 can include computer programs or instructions associated with secure communication via a PKI such as those discussed below which can direct the processor 804 in controlling the operation of the apparatus 800. The computer programs or instructions can include, for example, key acquisition 812, decryption/encryption 814, and a unity check operation 816. These are described in more detail below.

The key acquisition 812 instructions can include obtaining public and private keys according to, for example, Equations 1-3 of the RSA PKI. The decryption/encryption 814 instructions can include encrypting a message by the public key or decrypting ciphertext by the private key according to, for example, Equations 4-5 of the RSA PKI.

The unity key check operation 816 instructions are for rejecting encryption or decryption if a unity key was used. Particularly, for protecting against use of a unity key as a public key for encrypting a message into ciphertext or for decrypting a digital signature for verification, the unity key check operation 816 instructions can include storing the message or digital signature as input data into a memory buffer or storage element; storing the ciphertext or decrypted digital signature as output data into the memory buffer; and casting the input data and output data to an input data long datatype and an output data long datatype, respectively, and dereferencing the input data and output data. The unity key check operation 816 instructions can determine if the long of the input data is substantially equal to the long of the output data; and if the long of the input data is substantially equal to the long of the output data, determining if substantially all of the output data is substantially equal to all of the input data. If substantially all of the output data is substantially equal to all of the input data, then the encryption or the decrypted digital signature can be rejected.

For protecting against use of a unity key as a private key for encrypting a message into ciphertext to obtain a digital signature or for decrypting ciphertext, the unity key check operation 816 instructions can include storing the digital signature or ciphertext as input data into a buffer stream; storing the decrypted digital signature or decrypted ciphertext as output data into the buffer stream; and casting the input data and output data to an input data long and an output data long, respectively, and dereferencing the input data and output data. The unity key check operation 816 instructions can determine if the if the long of the input data is substantially equal to the long of the output data; and if the long of the input data is substantially equal to the long of the output data determine if substantially all of the input data is substantially equal to all of the output data. The digital signature or decrypted ciphertext is rejected if substantially all of the input data is substantially equal to all of the output data.

Any of the above can be embodied on a computer readable medium, which includes storage devices and signals, in compressed or uncompressed form. Exemplary computer readable storage devices include conventional computer system RAM, ROM, erasable, programmable ROM, electrically erasable, programmable ROM, and magnetic or optical disks or tapes. Exemplary computer readable signals, whether modulated using a carrier or not, are signals that a computer system can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

It should also be understood that although various logical groupings of functional blocks were described above, different realizations may omit one or more of these logical groupings. Likewise, in various realizations, functional blocks may be grouped differently, combined, or augmented. Furthermore, one or more functional blocks including those identified herein as optional can be omitted from various realizations. For example, the present description may describe or suggest a collection of data and information. One or more embodiments can provide that the collection of data and information can be distributed, combined, or augmented, or provided locally and/or remotely.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
    receiving a ciphertext from a sender;
    decrypting the ciphertext with a key to obtain a message;
    casting the ciphertext to a long datatype to obtain a long datatype ciphertext;
    casting the message to the long datatype to obtain a long datatype message;
    determining, by a processor, that a portion of the long datatype ciphertext is the same as a portion of the long datatype message;

comparing a block of the ciphertext with a block of the message based on the determination;

accepting the ciphertext if the block of the ciphertext is not the same as the block of the message; and rejecting the ciphertext if the block of the ciphertext is the same as the block of the message.

2. The method of claim 1, wherein the key is part of an asymmetric key pair and wherein the asymmetric key pair comprises a Rivest Shamir Adleman (RSA) key pair.

3. The method of claim 1, further comprising:
dereferencing the long datatype ciphertext; and
dereferencing the long datatype message.

4. A non-transitory computer readable storage medium comprising instructions for causing a processor to perform operations comprising:

receiving a ciphertext from a sender;
decrypting the ciphertext with a key to obtain a message;
casting the ciphertext to a long datatype to obtain a long datatype ciphertext;
casting the message to the long datatype to obtain a long datatype message;
determining, by a processor, that a portion of the long datatype ciphertext is the same as a portion of the long datatype message;
comparing a block of the ciphertext with a block of the message based on the determination;
accepting the ciphertext if the block of the ciphertext is not the same as the block of the message; and
rejecting the ciphertext if the block of the ciphertext is the same as the block of the message.

5. The non-transitory computer readable storage medium of claim 4, wherein the key is part of an asymmetric key pair and wherein the asymmetric key pair comprises a Rivest Shamir Adleman (RSA) key pair.

6. The non-transitory computer readable storage medium of claim 4, wherein the operations further comprise:
dereferencing the long datatype ciphertext; and
dereferencing the long datatype message.

7. A non-transitory computer readable storage medium comprising instructions for causing a processor to perform operations comprising:

receiving a digital signature from a sender;
decrypting the digital signature with a public key of an asymmetric key pair to obtain a decrypted digital signature, wherein the digital signature was encrypted with a private key of the asymmetric key pair;
casting the decrypted digital signature to a long datatype to obtain a long datatype decrypted digital signature;
casting the digital signature to the long datatype to obtain a long datatype digital signature;
determining, by a processor, that a portion of the long datatype decrypted digital signature is the same as a portion of the long datatype digital signature;
comparing a block of the decrypted digital signature with a block of the digital signature based on the determination;
accepting the digital signature if the block of the decrypted digital signature is not the same as the block of the digital signature; and
rejecting the digital signature if the block of the decrypted digital signature is the same as the block of the digital signature.

8. The non-transitory computer readable storage medium of claim of claim 7, wherein the private key is part of an asymmetric key pair and wherein the asymmetric key pair comprises a Rivest Shamir Adleman (RSA) key pair.

9. An apparatus comprising:
a memory to store a digital signature from a sender;
a processor to:
receive the digital signature;
decrypt the digital signature with a public key of an asymmetric key pair to obtain a decrypted digital signature, wherein the digital signature was encrypted with a private key of the asymmetric key pair;
cast the decrypted digital signature to a long datatype to obtain a long datatype decrypted digital signature;
cast the digital signature to the long datatype to obtain a long datatype digital signature;
determine that a portion of the long datatype decrypted digital signature is the same as a portion of the long datatype digital signature;
compare a block of the decrypted digital signature with a block of the digital signature based on the determination;
accept the digital signature if the block of the decrypted digital signature is not the same as the block of the digital signature; and
reject the digital signature if the block of the decrypted digital signature is the same as the block of the digital signature.

10. A method comprising:
receiving a digital signature from a sender;
decrypting the digital signature with a public key of an asymmetric key pair to obtain a decrypted digital signature, wherein the digital signature was encrypted with a private key of the asymmetric key pair;
casting the decrypted digital signature to a long datatype to obtain a long datatype decrypted digital signature;
casting the digital signature to the long datatype to obtain a long datatype digital signature;
determining, by a processor, that a portion of the long datatype decrypted digital signature is the same as a portion of the long datatype digital signature;
comparing a block of the decrypted digital signature with a block of the digital signature based on the determination;
accepting the digital signature if the block of the decrypted digital signature is not the same as the block of the digital signature; and
rejecting the digital signature if the block of the decrypted digital signature is the same as the block of the digital signature.

11. The method of claim 10, wherein the asymmetric key pair comprises a Rivest Shamir Adleman (RSA) key pair.

12. The apparatus of claim 9, wherein the processor is further to:
dereference the long datatype decrypted digital signature; and
dereference the long datatype digital signature.

13. The method of claim 10, further comprising:
dereferencing the long datatype decrypted digital signature; and
dereferencing the long datatype digital signature.

14. An apparatus comprising:
a memory to store a ciphertext and a message; and
a processor coupled to the memory, the processor to:
receive the ciphertext from a sender;
decrypting the ciphertext with a key to obtain a message;
cast the ciphertext to a long datatype to obtain a long datatype ciphertext;
cast the message to the long datatype to obtain a long datatype message;

determine that a portion of the long datatype ciphertext is the same as a portion of the long datatype message;

compare a block of the ciphertext with a block of the message based on the determination;

accept the key if ciphertext is not the same as the message; and determine that the key comprises a unity key and reject the key if ciphertext is the same as the message.

15. The apparatus of claim 14, wherein the processor is further to:

dereference the long datatype ciphertext; and dereference the long datatype message.

16. The apparatus of claim 14, wherein the key is part of an asymmetric key pair and wherein the asymmetric key pair comprises a Rivest Shamir Adleman (RSA) key pair.

* * * * *